United States Patent [19]
Yang

[11] Patent Number: 5,179,151
[45] Date of Patent: Jan. 12, 1993

[54] INTERNAL RESIN-TACKIFIED ACRYLIC POLYMERS CONTAINING CROSSLINKABLE COMONOMERS

[75] Inventor: Henry W. Yang, Kingwood, Tex.

[73] Assignee: Exxon Chemical Patents Inc., Linden, N.J.

[21] Appl. No.: 670,676

[22] Filed: Mar. 18, 1991

Related U.S. Application Data

[60] Division of Ser. No. 444,460, Dec. 1, 1989, Pat. No. 5,013,784, which is a continuation-in-part of Ser. No. 367,829, Jun. 19, 1989, abandoned.

[51] Int. Cl.$^5$ .............................................. C08K 5/01
[52] U.S. Cl. .................................. 524/458; 524/481; 524/484
[58] Field of Search ................... 524/458, 481, 484

[56] References Cited

U.S. PATENT DOCUMENTS 4,645,711  2/1982  Winszow et al. ................... 428/355

Primary Examiner—Joseph L. Schofer
Assistant Examiner—Jeffrey T. Smith
Attorney, Agent, or Firm—Catherine L. Bell; Myron B. Kurtzman; Daniel Lundeen

[57] ABSTRACT

Acrylic copolymer compositions which contain a tackifying hydrocarbon resin and a polyfunctional crosslinking monomer and the use of such composition in pressure-sensitive adhesives are described. The tackifying hydrocarbon resin is dissolved, as is the polyfunctional monomer, in a solution of alkyl(meth)acrylate and (meth) acrylic acid monomers and is present during the polymerization of the monomers to form a tackified acrylic copolymer.

7 Claims, No Drawings

INTERNAL RESIN-TACKIFIED ACRYLIC POLYMERS CONTAINING CROSSLINKABLE COMONOMERS

This is a division of application Ser. No. 444,460, filed Dec. 1, 1989 now U.S. Pat. No. 5,013,784 which is a continuation in part of 367,829 filed Jun. 19, 1989. Now abandoned.

This invention relates to acrylic copolymer latex compositions, useful as pressure-sensitive adhesives, which contain an internal tackifying hydrocarbon resin having improved peel strength and shear properties obtained by including a small amount of a crosslinkable comonomer in the polymerization reaction mixture. The tackifying hydrocarbon resin is dissolved in acrylic monomers to form a homogeneous solution and is present, along with the crosslinkable comonomer, during the polymerization of the monomers to form the acrylic copolymer latex.

BACKGROUND OF THE INVENTION

Tackified acrylic copolymers have long been used as pressure-sensitive. Such tackified copolymers have been prepared by adding a tackifying petroleum-based hydrocarbon resin or natural resin with an acrylic copolymer. While the resulting adhesive is often satisfactory to certain properties, such as tackiness and peel strength on substrates such as polyester or stainless steel, certain properties are found to be deficient, particularly the holding power on these substrates. Previously, increasing the peel strength of tackified acrylic copolymers to a value greater than 2.0 pounds per inch often caused diminishing shear adhesion fail temperatures (SAFT) and holding power. It is desirable to maintain high holding power and SAFT, particularly when the pressure-sensitive adhesive is to be used to prepare an adhesive tape.

The prior art describes attempts to prepare satisfactory tackified acrylic copolymers. For example, Japanese Patent J-59213783 teaches the preparation of a hot-melt pressure-sensitive adhesive by first heating a tackifying resin having a softening point between 60° and 200° C. to above its melting point, and adding to the hot melt a polymerization mixture of an alkyl (meth)acrylate, a functional monomer such as acrylic acid, and a radical initiator over a period of hours, with stirring, to form a pale yellow, transparent, solid hot-melt adhesive.

Japanese Patent J-59227967 discloses a hot-melt polymerization of an alkyl (meth)acrylate main monomer and a copolymerizable functional monomer including (meth)acrylic acid, maleic anhydride, maleic acid, and the like, where a surfactant is present with the resin during the polymerization to form a solid mass, hot-melt adhesive. In Japanese Patent 53074041, a polymerized powdery toner product is obtained by dissolving a binder resin such as a vinyl resin, acetal resin, epoxy resin or the like in a polymerizable liquid monomer such as styrene, vinyl toluene, (meth)acrylic acid or its ester, and the like, and polymerizing the monomers in bulk.

In Japanese Patent J-51125472, a petroleum resin emulsion is obtained by polymerizing vinyl monomers in the presence of petroleum resins having softening points of from 40° to 160° C., an average molecular weight of 300 to 3000, and an acid value and saponification value of less than 1. The monomers include for example, alkyl (meth)acrylates, vinyl acetates and vinyl chlorides, styrene, acrylonitrile, and acrylic acid. The emulsified mixture is then reacted in an emulsion polymerization reaction to form a shelf-stable emulsion adhesive. The resin emulsion produced in described as having fine particle sizes and ample stability, and when cured, the films produced have excellent water resistance and gloss.

Numerous approaches have been used to produce resin emulsions. One approach is to dissolve the resin in a hydrocarbon solvent, combine the resin solution and water to form an emulsion, and strip off the solvent. Invariably some residual hydrocarbon solvent remains in the finished emulsion, which is undesirable in certain applications. This has led to the development of solvent-free dispersions (see U.S. Pat. No. 2,809,948) and emulsions (see U.S. Pat. No. 3,377,298) of petroleum resins. In both of these formulations, ionic emulsifiers have been utilized; in the former a mixture of cationic and non-ionic surface active agents is used to achieve a resin emulsion; and, in the latter an ionic surfactant is used in combination with an aqueous gel of a swelling earth to produce an emulsion paste of a petroleum resin.

As mentioned above, there has generally been a decrease in shear properties associated with an increase of peel strength and tackiness. There is a need to improve peel strength of pressure-sensitive adhesives while still maintaining a high SAFT.

My copending application Ser. No. 360,507, filed Jun. 2, 1989, for "Internal Resin-Tackified Acrylics Polymers" (P-1413) deals with the problem somewhat but further improvement has been found to be desirable, particularly in improving the holding power at higher temperatures (SAFT).

Accordingly, it is an object of this invention to prepare a resin-tackified acrylic copolymer which has an improved peel strength and SAFT for application as pressure-sensitive adhesives.

It is a further object to provide a resin-tackified acrylic copolymer, wherein the tackifying resin is dissolved in the acrylic monomer solution with a crosslinkable monomer prior to the polymerization reaction to improve the peel strength and adhesion properties.

It is still further objective of this invention to cause additional improvement in the SAFT by incorporating into the monomer polymerization mixture a crosslinkable comonomer.

It is a still further object of this invention to provide pressure-sensitive adhesives useful to prepare tapes and useful laminating adhesives.

SUMMARY OF THE INVENTION

A tackified acrylic copolymer is prepared by dissolving a hydrogenated hydrocarbon resin in a liquid monomer mixture from which the copolymer is to be prepared by free radical initiated emulsion polymerization. In accordance with this invention, included in the reaction mixture is a small, but effective amount, usually from about 0.1 wt. % to about 3 wt. %, of a crosslinkable monomer. The resin, having an aromatic content of at least 10 wt. %, is present in amounts of about 10 to about 100 parts by weight, preferably 20 to 60 parts, per 100 parts of the monomer solution. The resin is dissolved in the monomers at ambient temperatures or higher, and the free-radical polymerization reaction is conducted, with stirring, at a temperature from about 25° C. to about 90° C.

A dispersion of polymer in the form of a latex is produced which may be easily applied to a substrate such as flexible polyester or polyolefin films where it is dried to form a pressure sensitive adhesive having a balance of good peel strength and shear strength, with the additional advantage of a high shear adhesion fail temperature (SAFT) provided by the presence of an effective amount of the crosslinking comonomer.

DETAILED DESCRIPTION OF THE INVENTION

Resins useful in the instant invention are generally well known and are defined as hydrogenated natural resins and thermoplastic resins obtained by polymerization, in the presence of a catalyst of the Friedel-Crafts type, of steam-cracked petroleum distillates, boiling in the range between about 30° C. and 280° C., or any fraction of these distillates boiling within the said range, or of polymerized mixtures of olefins and diolefins.

The hydrocarbon resins useful according to this invention are preferably petroleum resins prepared by homo and copolymerization of olefins, diolefins, and vinyl aromatic components, predominantly the C-5 to C-9 species, from distillates of cracked petroleum stocks. The feed stacks for the resin must, however, have at least about 10% by weight vinyl aromatic constituents, such as, for example, styrenes, alpha-methyl styrene, indene and vinyl toluene and other well known vinyl aromatic compounds. A Friedel-Crafts catalyst is typically employed and this resin-forming polymerization is performed at temperatures which range generally from 0° to 70° C. and preferably from 30° C. to 55° C. The resulting resin is then hydrogenated in accordance with the methods described in U.S. Pat. Nos. 4,650,829; 4,328,090 and 4,629,766 for example, the disclosures of which are incorporated herein by reference in their entirety for all purposes. The resulting hydrogenated resin retains a ring and ball softening point in the range of $-20°$ C. to about 150° C., preferably from about 10° C. to about 100° C. In the practice of this invention the pressure-sensitive adhesive formed from resins having a softening point from 15° C. to about 40° C. typically find their best use as laminating adhesives or as adhesives for labels. Those having softening points from about 70° C. to 100° C. for tapes.

Broadly, hydrocarbon resins are polymerized from petroleum cracked distillates boiling in the range of about 30° C. to 280° C. or any fraction boiling within this range having a vinyl aromatic content as set forth above. As is well known, the resins are prepared by treating the distillate with from 0.25 to 2.5% by weight of a Friedel-Crafts-type catalyst such as aluminum chloride, aluminum bromide, boron trifluoride, and the like or solutions, slurries, or complexes thereof. The reactions are conducted at temperatures in the range of 0° to 70° C., and preferably 30° C. to 55° C. Residual catalyst is quenched by suitable methods such as addition of methyl alcohol and subsequent filtration, water, and/or caustic washing. The final solution is then stripped of unreacted hydrocarbons and low molecular weight oils by vacuum or steam distillation. Properties of the hydrocarbon resins can be varied by changing conditions and feedstock as is well known.

The hydrocarbon resin is prepared by the hydrogenation of polymerized olefinically unsaturated monomers derived from petroleum cracking, preferably cyclic diolefins, (such as, for example, dicyclopentadiene) styrene alpha-methylstyrene and the like. Such resins, their preparation and hydrogenation are well known in the art and are commercially available under the trade designation, for example, ESCOREZ, Arcon, and the like.

Naturally occurring resins suitable for use in the present invention may be resin esters or terpenes such as alpha-pinene, beta-pinene, carene, limonene or other readily available terpinous materials, alpha-pinene and limonene being preferred. The material may be pure or the commercially available concentrates such as gum terpentine or alpha-pinene concentrates, which tend to be mixtures of various terpinous materials. A suitable natural resin contains from about 70 to 95 wt. % alpha-pinene, the remainder being other terpenes. Limonene streams are available and are known to those skilled in the art. These are typical streams useful in the present invention. The hydrogenation of these naturally occurring resins is well known and can be carried out using the procedures of the above-identified U.S. Patents.

In the practice of this invention the most successful tackified acrylic copolymers are produced when the resin is soluble in the selected monomer mixture at ambient temperature. Such resin should have a molecular weight of from about 500 to about 5000, preferably from about 1000 to about 2500. When the aromatic contents of the resin, usually a styrene or a vinyl toluene or vinyl xylene derivatives, decreases below about 30 wt. %, the mixture of acrylic monomers must be adjusted to reduce overall polarity of the monomer mixture in a manner well known to those skilled in such polymerizations. For example, a substitution of butyl acrylate for 2-ethylhexyl acrylate would reduce polarity. By lowering the polarity of the monomer mixture lower aromaticity in the resin can be tolerated and the resin will still dissolve in the monomers to form a solution.

It has further been discovered that aliphatic resins, such as those formed from amylenes, piperylene, cyclopentadiene and its derivatives are not necessarily soluble in the monomers selected, and thus are normally not used. In accordance with this invention, as previously mentioned, in order to form a suitable polymerization reaction mixture, it is necessary that the resins comprise from at least about 10% to 100% by weight vinyl aromatic content, preferably from about 20% to about 65% aromatic content; with 30% to 50% being the most preferred range.

The monomers used in the practice of this invention are vinyl monomers which are polymerizable by free radical reaction, preferably those materials described as acrylics; i.e., alkyl(meth)acrylates and (meth)acrylic acid. Mixtures of alkyl acrylates are usually included, which affect the solubility of the petroleum resins prior to polymerization, as well as final properties of the composition. These acrylate monomer mixtures generally comprise lower alkyl(meth)acrylates having 1 to 3 carbon atoms in the alkyl group of the ester and upper alkyl (meth)acrylates having 4 or more, usually up to about 14, preferably 4 to 8 carbon atoms. Other monomer components useful in accordance with the invention are the (meth) acrylic acid(s). Some preferred examples of monomers are as follows: acrylic acid, methacrylic acid, crotonic acid, maleic acid, itaconic acid, methyl (meth) acrylate, ethyl(meth)acrylate, propyl acrylate, 2-ethylhexyl acrylate, or n-butyl acrylate. Other monomeric material which can be employed can include acrylonitrile, vinyl acetate, vinylidene chloride, styrene, methyl styrene, and the like. The monomer mixture would contain from 1% to about 15%, preferably about 2% to about 6% of the (meth) acrylic acid;

0% to about 50%, preferably about 10% to 35%, lower alkyl (meth)acrylate; and from about 25% to 99%, preferably from 60% to about 88% upper alkyl(meth)acrylate. All percents are by weight of the monomer mixture. It should be noted that some "acrylic" monomer mixtures available include minor amounts of acrylonitrile, styrene, or vinyl acetate, and the like.

In the practice of the instant invention it has been discovered that the peel strength, shear strength, and SAFT of internally tackified acrylic copolymers can be dramatically improved and balanced by the incorporation in such reaction solution of a small amount of up to about 3 wt. %, preferably from 0.1 to 2 wt. % of the reaction components. Usually the small amount can be a crosslinkable monomer. For instance, the crosslinkable monomer helps to maintain the holding properties, particularly the shear and SAFT unlike other changes made to improve the peel strength. The effectiveness of the added amount can be easily determined by following the examples set forth herein.

This crosslinkable monomer can be any compound which contains at least 2 reactive non-conjugated double bonds. For example, an acrylated diester with the required double bonds to act as a crosslinking monomer can be produced by reacting either a poly(oxyethylene) or poly(oxypropylene) glycol with acrylic acid. The glycol would have an average molecular weight of from 200 to about 1000, preferably from 400 to 800. Other crosslinkable monomers can also be produced by reacting triethanolamine or trimethylolpropane with a (meth)acrylic acid to form a trimethacrylate thus providing the terminal double bond. Functional end groups can be hydroxyl, amine, carboxyl, or cyano. Other useful preparation of such crosslinking agents is well known in the art. It was unknown and, of course, somewhat surprising that the incorporation of a small amount of such crosslinkable monomer into the internally tackified copolymer would produce dramatic improvement in the holding properties of pressure-sensitive adhesive. Some useful crosslinkable monomers are the dimethacrylate of a 600 molecular weight poly(oxyethylene) glycol and trimethylolpropane trimethacrylate. Of course, many other crosslinkable comonomers can be used and are readily determined by those in the art.

The above-mentioned crosslinkable monomers are dissolved in the polymerizable monomer solution in the presence of the hydrocarbon resin as mentioned above. Generally, the reaction of acrylate monomers to form acrylate copolymers is well known to those of ordinary skill in the art to include the water to adjust the solids content, a surfactant to aid in the formation of monomer-in-water emulsion and to act as a suspending agent for the solids in the final copolymer, which are dispersed in the aqueous medium both during and after the polymerization. The surfactants useful in the practice of this invention are well-known and are present in quantities sufficient to place the reactants in the emulsion prior to reaction and maintain the product in suspension after reaction. Of particular applicability are blends of anionic and non-ionic surfactants having a HLB of from about 15 to 42, especially around 40. Especially preferred are the widely used disodium sulfosuccinate as an anionic surfactant and ethylene oxide adducts of nonyl phenol as nonionic surfactants. While the ranges of surfactants are well-known, the amount will preferably range from about 1 to about 5 parts, normally 2 to 4 parts, per 100 parts of the monomers. Also in the reaction mixture is an initiator, such as for example, sodium persulfate or an ammonium persulfate present in catalytic amounts well-known to those skilled in the art, such as for example, about 0.1 part per 100 parts of reaction mixture. In some instances it may be advantageous to buffer the pH of the solution by including a well-known buffering agent such as, for example, sodium bicarbonate.

Notwithstanding the foregoing, the selected petroleum resin is mixed with the selected monomers to form a monomer solution containing from about 10 to about 100 parts resin per 100 parts (PHR) of the liquid mixture of monomer reactants and more preferably from about 20 to about 60 parts per 100 parts of monomer reactants. Most preferably, from 25 to 55 parts resin per 100 parts monomer reactants are present. As stated herein before, the petroleum resin is selected so that it will be soluble in the monomer mixture at ambient temperatures, but notwithstanding such, the temperature could be raised to the point where it is easily solubilized; i.e., from about 25° C. to about 40° C.

Included also in the solution is polyfunctional crosslinkable monomers as mentioned above. The crosslinkable monomer may be incorporated in the entire polymerizable mixture of fed into it after the reaction has begun, thus being present in the later stages of the reaction. When the crosslinkable monomer is not mixed with the entire mixture, it is preferably added with about the last 25% of the polymerizable reaction mixtures.

In the practice of the present invention, the polymerization reaction is to be carried out with no chain transfer agent being used. We have also discovered that the presence of an antioxidant in the resin is to be avoided because it inhibits crosslinking. It is preferred that the solution of monomers, crosslinking compound and resin be dispersed into a water medium to form an emulsion at ambient temperatures in the presence of a satisfactory surfactant. The reaction mixture thus formed, including the initiators, must be placed in a reaction vessel, evacuated of oxygen by nitrogen purge, and the polymerization reaction conducted with stirring in the sealed container preferably under a nitrogen blanket.

The addition of the monomer solution containing the hydrocarbon resin and polyfunctional crosslinker is normally carried out over a period of time. Typically, about 15 wt. % of the total reaction mixture would be charged initially into the reactor and polymerized for a short period of time to obtain solids content of about 17-20 wt. %. Optionally, no crosslinking monomer is present at this point. Once a selected solids level is attained, the balance of the monomer solution containing crosslinkable compound would be evenly metered into the reaction vessel over a period of time, normally several hours, usually 3 to 6 hours depending upon the size of the reaction and quantity to be added. Once the addition of the monomer solution including the crosslinker is complete, the polymerization is allowed to continue, usually for another hour while maintaining the reaction temperature, normally, with the range of from 45° C. to about 90° C., preferably between about 50° C. and 85° C. The polymerization continues until the total solids content of the material in the reactor reaches its theoretical level based upon the amount of reactants charge to the reaction mixture, usually, in practice, about 45 to about 55 wt. %, but the overall solids content may be as high as 70% with there being no real lower limit. While there is no real theoretical lower limit, a practical lower limit of about 30% solids content is recognized by those skilled in the art. In a commercial sense, the highest limits attainable are preferred.

Once the reaction is complete the product in the form of a dispersed polymer latex is allowed to cool to room temperature, and the dispersed polymer latex is separated from coagulum formed during polymerization, usually by filtration. In the practice of the invention 200-mesh "sock" filter has been found satisfactory. Such latex can be coated, for example, on a substrates such as film or paper for use as a tape. The coated substrate would be dried, usually by circulating hot air at from about 100° C. to about 110° C. for about a few, usually from about 2 to about 5, minutes. Those skilled in the art would readily recognize other processing parameters for such coated substrate. The latex coating usually results in a dried adhesive film of from about 0.3 to about 3.0 mils, preferably about 1.0 mil of thickness, even though thicker or thinner films may be desired in certain applications of the instant invention. Thus dried and cured, the product is in condition for use as a pressure-sensitive adhesive tape.

In certain embodiments of the practice of this invention, the adhesives formed find applications as non-pressure-sensitive adhesives such as, for example, laminating adhesives, binders for woven and nonwoven fabrics, and binders for pressed wood production. For example, the certain species useful as laminating adhesives; i.e., those with high peel strength but low shear properties, would be used to join two or more sheets of material together such as a layer of plastic sheeting to a layer of wood or a multiple layer of wood to form a plywood product.

The foregoing invention having now been described, the following examples are provided to further teach the preferred embodiment and best modes for practicing the described invention and to aid others in the practice of the scope of such invention herein provided.

EXAMPLE 1—COMPARATIVE

This example illustrates the synthesis of acrylic copolymer emulsions. The actual ingredients charged into the reactor are summarized in Table 1 below. Various amounts of the chain transfer agent, t-dodecanethiol are used in the preparation of Samples 1-4, in order to obtain the copolymers with various molecular weight.

TABLE 1

A. Initial Charge:
  24.0 parts distilled water
  0.1 parts Igepal CO-850, an ethylene oxide adduct of nonyl phenol (sold by GAF)
  0.2 parts sodium bicarbonate
  0.05 parts sodium persulfate
B. Monomer Solution:
  24.2 parts distilled water
  3.16 parts Emcol K-8300, an anionic surfactant manufactured by Witco Chemical
  0.05 parts sodium persulfate
  37.5 parts 2-ethylhexyl acrylate
  10.5 parts ethyl acrylate
  2.0 parts acrylic acid
  0–0.1 part t-dodecanethiol A 2-liter, four-neck reaction flask equipped with a stirrer, a condenser, a thermosensor, and a monomer addition tube was flushed with nitrogen for 15 minutes. The initial charge (A) was placed in the flask with stirring and continued nitrogen purging for additional 20 minutes. At the end of the 20 minutes, the temperature was raised to 65° C.

In a separate vessel, a monomer emulsion according to the composition (B) was prepared. When the reaction flask temperature was equilibrated at 65° C., 15 wt. % of the monomer solution (B) was added to the flask and allowed to polymerize for 30 minutes. The total solids at the end of the 30 minutes was about 18%. When the total solids reached this range, the remaining monomer emulsion (B) was evenly metered into the flask over a period of 3 hours. After the monomer addition, the reaction was allowed to continue at 65° C. for 2 additional hours and then cooled to room temperature. Stirring was continued throughout the procedure.

The final total solids was 50% by weight, particle size 150–250, MM, and Brookfield viscosity 500–1,000 cp. The coagulum content of about 2% of the total reactants charged was removed by filtration.

Pressure-Sensitive Adhesive (PSA) Performance Test

The polymer latex prepared as described above was knife-coated on a Mylar ® film and dried in an air circulating oven for 3 minutes at 110° C. The dried adhesive coating was approximately 1.5 mils thick. The adhesive was bonded to a stainless steel surface for PSA performance tests. Peel (180°) adhesion was obtained using Test No. PSTC-1 of the Pressure Sensitive Tape Council. Shear test was performed using PSTC-7. SAFT (Shear Adhesion Fail Temperature) test was similar to shear test except that the test temperature is increased at the rate of 10° F. per 15 minutes. The temperature at which shear failed is reported as SAFT. Both SAFT and shear were tested at 1 square inch and 1,000-gram hang weight.

PSA performance is sensitive to the molecular weight of the polymer. A chain transfer agent such as t-dodecanethiol is commonly used to control the molecular weight. In order to demonstrate the MW effect on PSA properties, samples 1-4 were synthesized according to the above procedures, but with various amounts of chain transfer agent.

TABLE 2

| Samples | Dodecanethiol parts | 180° Peel (lbs/in) | SAFT (°F.) | Shear (hrs) |
| --- | --- | --- | --- | --- |
| 1 | 0.0 | 1.1 | 290+ | 100+ |
| 2 | 0.025 | 1.1 | 290+ | 100+ |
| 3 | 0.05 | 1.6 | 290+ | 18 |
| 4 | 0.075 | 1.7 | 112 | 3 |

Samples with t-dodecanethiol level higher than 0.075 parts show cohesion failure in the peel test have very poor shear, less than 1 hour. These samples are not useful for PSAs.

EXAMPLE 2

The synthesis procedure described in Example 1 was followed using the initial charge and monomer emulsion compositions of Table 1, except that the monomer composition for the Samples 5-8 were changed to include different amounts of petroleum resins (ESCOREZ ECR-149-Exxon Chemical Company, Houston, TX, is a hydrogenated hydrocarbon resin containing 50% aromaticity with a softening point of about 95° C.) dissolved in the monomer solution as illustrated in Table 3 below (all ingredient units are in parts by weight). No chain transfer agent was used. ECR-149 has an average molecular weight of about 1000 and 50 wt. % aromaticity.

TABLE 3

| Samples | ECR-149 | Acrylic Acid | Ethyl Acrylate | 2-Ethylhexyl Acrylate |
|---|---|---|---|---|
| 5 | 10.0 | 1.6 | 8.4 | 30.0 |
| 6 | 11.6 | 2.3 | 7.7 | 28.4 |
| 7 | 11.6 | 1.5 | 8.1 | 28.8 |
| 8 | 15.0 | 1.4 | 7.4 | 26.2 |

The PSA performance results of above samples were obtained following same procedures and at same conditions are summarized on Table 4 below.

TABLE 4

| Samples | 180° Peel (lbs/in) | SAFT (°F.) | Shear (hrs) |
|---|---|---|---|
| 5 | 1.6 | 290+ | 100+ |
| 6 | 2.4 | 290+ | 100+ |
| 7 | 2.5 | 290+ | 26 |
| 8 | 3.1 | 188 | 22 |

Comparing the results in Table 4 with Table 2, it is clear that a significantly higher peel strength PSA product was obtained while maintaining high shear properties. The improved balance of peel and shear properties cannot be obtained through conventional acrylic composition using externally introduced tackifier.

EXAMPLE 3

The same procedure as described in Example 1 above was followed per the tests below. All of the initial charge (A) and the Monomer Solution (B) are the same as Example 1, except that the composition of the monomer solution which also contain the dissolved crosslinkable comonomer according to Table 5 below (all ingredient units are in parts by weight):

TABLE 5

| Samples | ECR-149 | Acrylic Acid | Ethyl Acrylate | 2-Ethylhexyl Acrylate | S-252* |
|---|---|---|---|---|---|
| 9 | 0 | 2.0 | 10.5 | 37.5 | 0.00 |
| 10 | 0 | 2.0 | 10.5 | 37.4 | 0.24 |
| 11 | 0 | 2.0 | 10.5 | 37.4 | 0.62 |
| 12 | 15 | 1.4 | 7.4 | 26.2 | 0.00 |
| 13 | 15 | 1.4 | 7.4 | 26.2 | 0.11 |

*S-252 is Poly(oxyethylene glycol) (600 mol. wt.) dimethacrylate manufactured by Sartomer Company For Samples 10 and 11, the crosslinkable comonomer was mixed with the whole monomer emulsion. For Sample 13, the crosslinkable comonomer was only mixed with the last 25% monomer emulsion added to the reaction vessel.

Table 6 below summarized the PSA performances of these samples:

TABLE 6

| Samples | 180° Peel (lbs/in) | SAFT (°F.) | Shear (hrs) |
|---|---|---|---|
| 9 | 1.1 | 290+ | 100+ |
| 10 | 1.0 | 290+ | 100+ |
| 11 | 0.53 | 290+ | 100+ |
| 12 | 3.1 | 188 | 22 |
| 13 | 3.1 | 223. | 87 |

Samples 9 to 11 demonstrate the effect of a crosslinkable comonomer on peel strength with no resin present. The peel strength normally suffers if the degree of the crosslinking is too high. By incorporating hydrocarbon resin in the acrylic copolymer particles, as in Sample 12, significant increase of peel strength is obtained. Sample 13 contains minor amounts of a crosslinkable comonomer, S-252, together with the same amount of resin in the composition as that of Sample 12. The shear properties are much improved while the peel adhesion is maintained at the same level.

EXAMPLE 4

Following the procedure and formulations of Examples 1 and 2, 1% of several crosslinkable comonomers was added to the polymerizable solutions incorporating the resin ESCOREZ ECR-149-ID (EXXON), having a softening point of 90.5° C. The crosslinkable comonomer was change das set forth in Table 7 below to illustrate the properties of the pressure-sensitive adhesives prepared and tested as described above.

TABLE 7

INTERNAL RESIN TACKIFYING ACRYLICS CONTAINING CROSSLINKABLE COMONOMER (RESIN USED: ECR-149, SOFTENING POINT = 90.5° C.)

| Sample Number | Resin Level (PHR) | Crosslinkable Comonomer* | Peel (lb/in) | SAFT (°F.) | Shear (hrs) |
|---|---|---|---|---|---|
| 14 | 40 | Control, No Comonomer | 2.6 | 253 | 100+ |
| 15 | 40 | Glycidyl Acrylate | 2.2 | 300+ | 100+ |
| 16 | 40 | 2-Hydroxyethyl acrylate | 2.2 | 300+ | 39 |
| 17 | 40 | N-Methylol Acrylamide | 2.4 | 300+ | 14 |
| 18 | 40 | TMPTMA** | 2.4 | 300+ | 54 |
| 19 | 40 | PEG-600-DMA***, 0.2% | 2.3 | 280 | 100+ |
| 20 | 40 | PEG-600-DMA***, 0.4% | 2.4 | 287 | 100+ |
| 21 | 50 | PEG-600-DMA***, 0.2% | 2.7 | 219 | 100+ |
| 22 | 50 | PEG-600-DMA***, 0.4% | 2.6 | 241 | 100+ |
| 23 | 50 | Control, No Comonomer | 2.8 | 244 | 100+ |

*1 wt. % unless otherwise noted
**Trimethylolpropane Trimethacrylate (Sartomer-350).
***Polyethylene Glycol (600) Dimethacrylate (Sartomer-252).

EXAMPLE 5

Following the procedure set forth above in Examples 1 and 2, additional internally tackified acrylic copolymers containing crosslinkable comonomers were compared using resins having different softening points, to wit: ESCOREZ ECR-149 having a softening point of 95° C. and ECR-149-BPC having a softening point of 87° C. The results of these tests are given on Table 8 following.

It is seen by the foregoing that the internally tackified copolymers themselves have improved holding properties by the inclusion of the effective amount of the crosslinkable polyfunctional comonomer.

As is apparent from the foregoing description, the materials prepared and the procedures followed describe specific embodiments of the invention. It is apparent from the foregoing description that, while predictive forms of the invention have been illustrated and described, various modifications can be made without departing from the spirit and scope of this invention. Accordingly, it is not intended that the invention be limited except by the appended claims.

TABLE 8

INTERNAL RESIN TACKIFYING ACRYLICS
CONTAINING CROSSLINKABLE COMONOMER
1. ECR-149, SOFTENING POINT = 95° C.;
2. ECR-149, SOFTENING POINT = 87° C.

| Sample Number | Resin | (PHR) | Crosslinkable Comonomer | Level (%) of Crosslinking Monomer | PSA PERFORMANCE | | |
|---|---|---|---|---|---|---|---|
| | | | | | Peel (lbs/in) | SAFT (°F.) | Shear (Hours) |
| 24 | ECR-149 | 40 | PEG-600-DMA | 0.2 | 2.6 | 300+ | 19 |
| 25 | ECR-149 | 50 | PEG-600-DMA | 0.2 | 2.2 | 300+ | 20 |
| 26 | ECR-149-BPC | 40 | PEG-600-DMA | 0.2 | 3.1 | 223 | 87 |
| 27 | ECR-149-BPC | 50 | PEG-600-DMA | 0.2 | 3.1 | 131 | 57 |
| 28 | ECR-149 | 40 | — | 0 | 3.1 | 188 | 22 |
| 29 | ECR-149-BPC | 40 | — | 0 | 2.7 | 136 | 71 |
| 30 | ECR-149-BPC | 50 | — | 0 | 3.3 | 128 | 40 |

What is claimed:

1. A method for preparing a tackified acrylic copolymer composition having increased peel strength while resisting loss of holding properties which comprises the steps of:
   (a) dissolving from about 10 to about 100 parts of a hydrogenated hydrocarbon resin, or a naturally occurring resin, per 100 parts in a liquid mixture of free-radical polymerizable monomers to form a polymerizable vinyl monomer reactant solution, the hydrocarbon resin, or the naturally occurring resin, having a molecular weight of from about 500 to about 5000 and an aromatic content of at least 10% by weight;
   (b) emulsifying the reactant solution in an aqueous medium;
   (c) polymerizing the emulsified monomers, in the absence of oxygen, in the presence of the resin, a free-radical polymerization initiator and small, but effective, amount of polymerizable crosslinking monomer to form an acrylic copolymer latex; and
   (d) recovering the tackified acrylic copolymer latex.

2. The method of claim 1 wherein the crosslinking monomer is present in an amount of from about 0.1 wt. % to about 3 wt. % of the monomer reactant solution.

3. The method of claim 2 wherein the crosslinking monomer is mixed and added with the polymerizable monomers after the polymerization has begun.

4. The method of claim 3 wherein the crosslinking monomers is mixed and added to the polymerization with the last 25% of the polymerizable monomers.

5. The method of claim 1 wherein the monomer solution comprises from about 1 to about 15 wt. % of a (meth) acrylic acid, from 0 to about 50 wt. % of a lower alkyl (meth) acrylate ester and from about 25 wt. % to about 99 wt. % of an upper alkyl (meth) acrylate ester.

6. The method of claim 1 wherein the monomer solution comprises from about 2 wt. % to about 6 wt/% (meth) acrylic acid, from about 10 wt % to about 35 wt. % of a lower alkyl (meth) acrylate acid, and from about 60 wt. % to about 88 wt. % of an upper alkyl (meth) acrylate.

7. The method of claim 1 wherein the resin is a hydrogenated petroleum hydrocarbon resin, or a naturally occurring resin, having an average molecular weight of from about 100 to about 2500 and an aromatic content of from about 10 wt. % to about 65 wt. % and the monomers include from about 2 wt. % to about 6 wt. % acrylic acid, from about 10 wt. % to about 35 wt. % ethyl acrylate and from about 60 wt. % to about 88 wt. % 2-ethylhexyl acrylate, wherein the resin is present in the monomer reactant solution in amounts of from about 20 to about 55 parts resin per 100 parts monomers polymerized.

* * * * *